United States Patent [19]
Jones

[11] Patent Number: 5,185,845
[45] Date of Patent: Feb. 9, 1993

[54] OPTICAL FIBER CLOSURE HAVING ENHANCED STORAGE CAPABILITY

[75] Inventor: Wesley W. Jones, Lawrenceville

[73] Assignee: AT&T Bell Laboratories, Murray Hill, N.J.

[21] Appl. No.: 776,720

[22] Filed: Oct. 15, 1991

Related U.S. Application Data

[63] Continuation-in-part of Ser. No. 627,072, Dec. 13, 1990.

[51] Int. Cl.⁵ ............................ G02B 6/36; G02B 7/26
[52] U.S. Cl. .................................................. 385/135
[58] Field of Search ............................ 350/96.2, 96.22; 385/135

[56] References Cited
U.S. PATENT DOCUMENTS 4,927,227  5/1990  Bensel et al. .................... 350/96.2

Primary Examiner—William L. Sikes
Assistant Examiner—Robert E. Wise
Attorney, Agent, or Firm—Edward W. Somers

[57] ABSTRACT

An optical fiber cable closure (20) includes a cable termination assembly (22) and a cover (23) into which the termination assembly is inserted. The cable termination assembly includes two spaced end plates (34,36) through which cables (28,29) to be spliced extend. One of the end plates supports a frame (101) which supports a plurality of optical fiber splicing trays (120—120). Adjacent end portions of the trays are staggered and hinged so that some trays may be moved pivotally to expose others. Optical fibers from each incoming cable are routed in individual tubes (115—115) or as ribbons from an optical fiber breakout (110) mounted in the frame to selected ones of the trays. Hinge lock plates (130—130) which complete a hinge for each tray also serve to clamp the tubes incoming to each tray to prevent unintended movement. Each of the trays may be provided with a plurality of organizing modules (140,140) each of which is adapted to hold a plurality of optical fiber connective devices. Advantageously, each of the modules includes a compliant insert (160) which not only holds a plurality of splicing connections but also is capable of storing any of a plurality of commercially available connective arrangements. The modules have utility in environments other than in closures.

25 Claims, 6 Drawing Sheets

OPTICAL FIBER CLOSURE HAVING ENHANCED STORAGE CAPABILITY

This application is a continuation-in-part of application Ser. No. 07/627,072, filed on Dec. 13, 1990.

TECHNICAL FIELD

This invention relates to an optical fiber cable closure having enhanced storage capability. More particularly, the invention relates to a closure for optical fiber cables which is capable of storing a larger number of optical fiber splices than prior art closures and of storing different commercially available optical fiber splicing arrangements.

BACKGROUND OF THE INVENTION

The use of communication cables which include a plurality of optical fibers is rapidly expanding. An optical fiber cable may comprise a plurality of glass fibers each of which is protected by at least one layer of a coating material. The optical fibers may be assembled into units in which the fibers are held together by binder ribbons or tubes to provide a core. Another optical fiber cable core includes a ribbon type optical fiber arrangement in which a plurality, such as twelve fibers for example, are arrayed together side by side. A plurality of these ribbons may be stacked to obtain a high fiber count cable. The core is enclosed by a plastic core tube and a plastic jacket. Ribbon type cable in which a relatively large number of optical fibers may be packaged appears to be ideally suited for fiber-to-the-customer use.

Whatever the structure of a cable, there must be provisions for splicing transmission media at an end of a given length of cable to corresponding transmission media at an adjacent end of another length of cable. In wire-like metallic conductor communication practice, it is conventional to use a splice closure, within which strength members of the cable ends may be anchored and all conductors spliced, wrapped and stored and protected environmentally. During the splicing of metallic conductors, it is customary to bend sharply the conductors, to provide access to other connections.

The physical nature of glass optical fibers forecloses the adoption of splicing techniques which are used with metallic conductors within such a splice closure. Because of their small size and relative fragility, special considerations must be given to the handling of optical fibers in closures. Transmission capabilities may be impaired if an optical fiber is bent beyond an allowable bending radius, the point at which light no longer is totally contained in the core of the fiber. Furthermore, fibers are brittle and their expected lives will be reduced if bent more than the minimum bending radius. Generally, the radius to which the optical fiber can be bent without affecting orderly transmission is substantially greater than that radius at which the optical fiber will break. Whereas glass and silica, the materials used to make optical fibers, are in some respects stronger than steel, optical fibers normally do not possess this potential strength because of microscopic surface fractures, which are vulnerable to stress and spread, causing the fiber to break easily.

It should be clear that, an optical fiber cable does not lend itself to the splicing practices of wire-like communication conductors. The individual glass fibers cannot just be twisted, tied, wrapped and moved into a splice closure, in anything like the manner of wire-like metallic conductor cables. These small diameter glass fibers cannot be crimped or bent at small angles, without breakage. Inasmuch as glass fibers have memory and tend to return to a straight-line orientation, placement in a splice closure becomes somewhat difficult. Moreover, the interconnection of optical fibers is a precision operation which in the past has tended to discourage some from performing splicing operations within a manhole, in a duct, or a pole-suspension elevation. And yet, to do otherwise becomes more expensive.

These problems are particularly acute in multifiber cables where individual optical fibers must be spliced in a manner which allows repairs and rearrangements to be made in the future. In addition, fiber slack normally must be provided adjacent to the splices. The need to store the slack further complicates the problem of providing a suitable optical fiber closure.

When splicing optical fibers by fusion or by mechanical means, it becomes necessary to provide enough slack fiber so that the fiber can be pulled out of the splice case for the preparation of fiber ends and the joining together. This requires at least about 0.5 meter of fiber from each cable to be stored in the splice closure when the closure is sealed, that is when the splicing has been completed. For a multifiber cable there must be a method of storing this slack, of protecting the splice and of keeping the fibers together in an orderly manner. The splices should be easily accessible to facilitate the rearrangement of the optical fibers and splices.

Optical fiber connecting arrangements must be protected from forces which could distort their shape or pull the fibers out of the arrangements. Although it is important that large forces are not applied to the connective arrangements, it also is important that they be secured in position. Any axial or torsional movement thereof could cause movement of the fibers which could cause attenuation of the optical signal being transmitted therealong.

Furthermore, there are a number of different kinds of splicing arrangements which are used commercially. Desirably, a closure should be capable of accommodating at least the more popular of these splicing arrangements. Also, because of the thrust toward fiber-to-the-customer architectures which may take place in the not too distant future, a closure must be able to accommodate a larger number of splices than has been customary in the art.

The above-enumerated problems must be overcome inasmuch as it is necessary to splice together the ends of optical fiber cables in field locations. A new closure is sought after to facilitate splicing in which suitable protection is afforded the optical fibers. Provisions must be included in the sought-after splice closure for storing several kinds of splicing arrangements.

As must be expected, fiber splice organizers and splice closures are available in the prior art. These prior art organizers and closures have suffered from a variety of shortcomings. Typically, they have been somewhat complex, difficult to use and difficult to access. Some of the prior art splice organizers have tended to place undue stresses on the optical fibers resulting in fiber damage. In addition, these prior art closures often have failed to provide simple to use, positive means for routing the optical fibers in an effective manner to the organizers and for storing slack.

For example, a splice closure with a central transverse bulkhead has been used. Individual fibers are spliced and are attached to the bulkhead for support. A disadvantage of this approach is the lack of facilities for the storage of slack in the fibers. In other splicing arrangements, all the optical fibers in a cable are looped within the same retainer or fiber slack is stored on spools. In either case, identification, repair or splice work of individual fibers is extremely difficult without a major rearrangement within the splice closure. This is undesirable because the transmission capability in active fibers can be affected as they are moved.

In another closure of the prior art, there is provided a device for organizing a plurality of individual optical fibers or other similar type conductors or fibers at a slack or splice point. A device having modular construction which is suitable for installation in standard splice closures is provided. The device comprises a plurality of tray-like members each adapted to retain and store at least one fiber. The device provides access to the individual fibers contained in the trays. Each tray may be marked to identify individual fibers therein. The trays are stacked one on top of the other, and each is hinged separately at one end thereof to a carrier, thus allowing them to move relative to one another like bound pages. Each tray-like support has a width which is adequate to provide the minimum bending radius specified for that fiber.

In another prior art optical fiber cable closure, optical fiber transitions with a controlled bend radius are anchored from each cable to a hinged organizer tray. This arrangement provides ready access to in-service optical fibers without the risk of inadvertent bending of the fibers. However, the arrangement of optical fibers in a cable to different trays is somewhat cumbersome to carry out and there appears to be a lack of protection for the fibers in the transition from the cables to the trays. This problem has been solved by the arrangement shown in U.S. Pat. No. 4,927,227, which issued on Apr. 22, 1990 in the names of W. H. Bensel, et al. Therein, a support member includes a support base for supporting an optical fiber breakout and a plurality of splice trays. The breakout allows a user to separate fibers into groups before they are routed to ones of the trays. However, in this last-described closure, there appears to be limited storage capacity and lack of ability to accommodate as many different splicing arrangements as desired. Current thinking would require each tray to store thirty-six splices. In still another closure, each tray includes a plurality of nests formed from a compliant material which allows each nest to receive a plurality of splicing arrangements. However, all of the nests are integral to each tray, although some may not be used immediately, or ever.

What the prior art seemingly lacks is an optical fiber cable closure which provides enhanced storage capability. Enhanced storage capability is interpreted to mean not only enhanced quantity of splice storage spaces over prior art closures, but also the capability to store different kinds of splicing arrangements. Further, in order to control investment, the sought-after closure should be such that a craftsperson has the flexibility of selecting, within a predetermined range, the number of splices which can be accommodated in each tray.

SUMMARY OF THE INVENTION

The problems of prior art optical fiber closures have been overcome by an optical fiber cable closure of this invention. The closure includes a tubular cover having a closed end and an open end and a cable termination assembly which is adapted to be received within the cover. The cable termination assembly includes cable entry facilities through which the cables to be spliced are routed. A support member extends from the cable entry facilities and has a free end disposed adjacent to the closed end of the cover. The support member includes a support base for supporting an optical fiber breakout and a plurality of optical fiber splice trays.

The closure includes provisions for causing the cover to be sealed to the cable termination assembly. The tubular cover having an open end and a closed end is moved over the trays and the end plates to have the periphery of the open end secured to a portion of the cable termination assembly.

Mounted on each tray is at least one organizing module each of which is capable of holding a plurality of optical fiber connective arrangements. Each module includes an insert which is comprised of a compliant material and as such is capable of accommodating different kinds of connective arrangements such as, for example, fusion splices and cleave, sleeve, and leave splicing connectors and of holding securely the splicing connectors in nests therewithin. Each tray is capable of holding a plurality of organizing modules which may be added as needed.

After outer sheath components of cables which enter the closure are removed, the optical fibers and an enclosing core tube or tubes or ribbons are directed to one end of an optical fiber breakout. The optical fibers extend into the breakout and at an opposite end are routed in tubes rearwardly and then upwardly to selected ones of the trays. The optical fiber breakout allows a user to separate optical fibers of each cable into groups to be routed to one or more trays where optical fibers extending from one tube are spliced to optical fibers extending from another tube. Further, this is accomplished with the optical fibers in a transition zone between the cables and the routing tubes being protected.

The organizer trays of the closure of this invention may be hinged. In that embodiment, the support member also has a plurality of opposed aligned pins which are staggered in a direction from the cable entry to the free end of the support member. Pairs of the opposed hinge pins for the trays are maintained in engagement with the trays by hinge lock plates.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
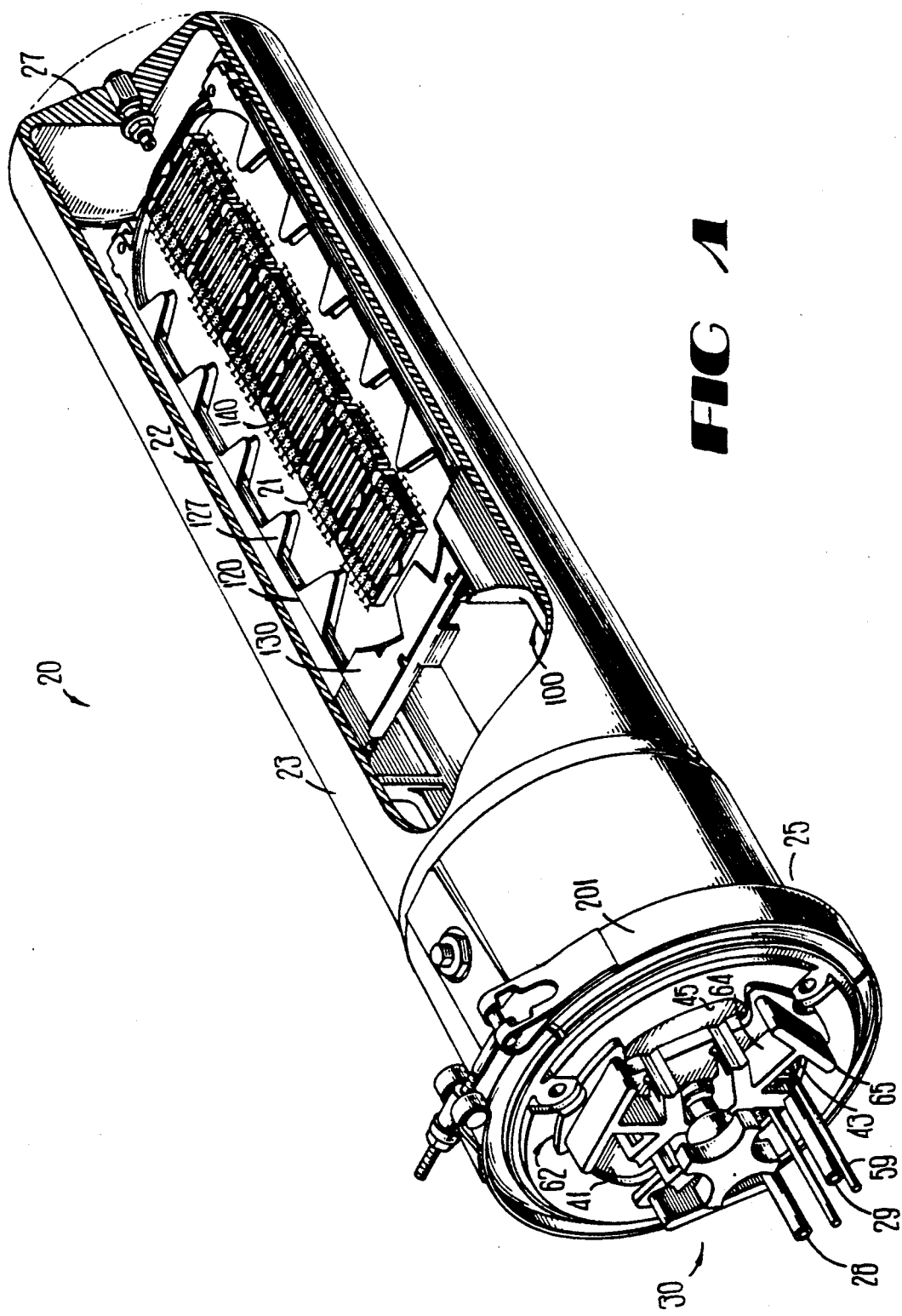
FIG. 1, is an overall perspective view of a closure of the invention which includes a cable termination assembly and a cover.

Referring now to FIG. 1 there is shown an optical fiber cable closure which is designated generally by the numeral 20. The closure 20 includes a cable splicing termination assembly (see also FIG. 2) which is designated generally by the numeral 22 and in which optical fibers 21-21 are spliced and/or stored and a cover 23. The cover 23 is cylindrically shaped and includes an open end 25 and a closed end 27. In order to assemble the cable splicing termination assembly 22 with the cover 23, the cable splicing termination assembly is inserted into the open end 25 of the cover and moved toward the closed end. Whereas the following description describes the splicing of two cables 28 and 29, it should be appreciated that the closure 20 can accommodate additional pairs of cables to be spliced or can be used to store optical fibers for future splicing to branch cables.

Figure 2:
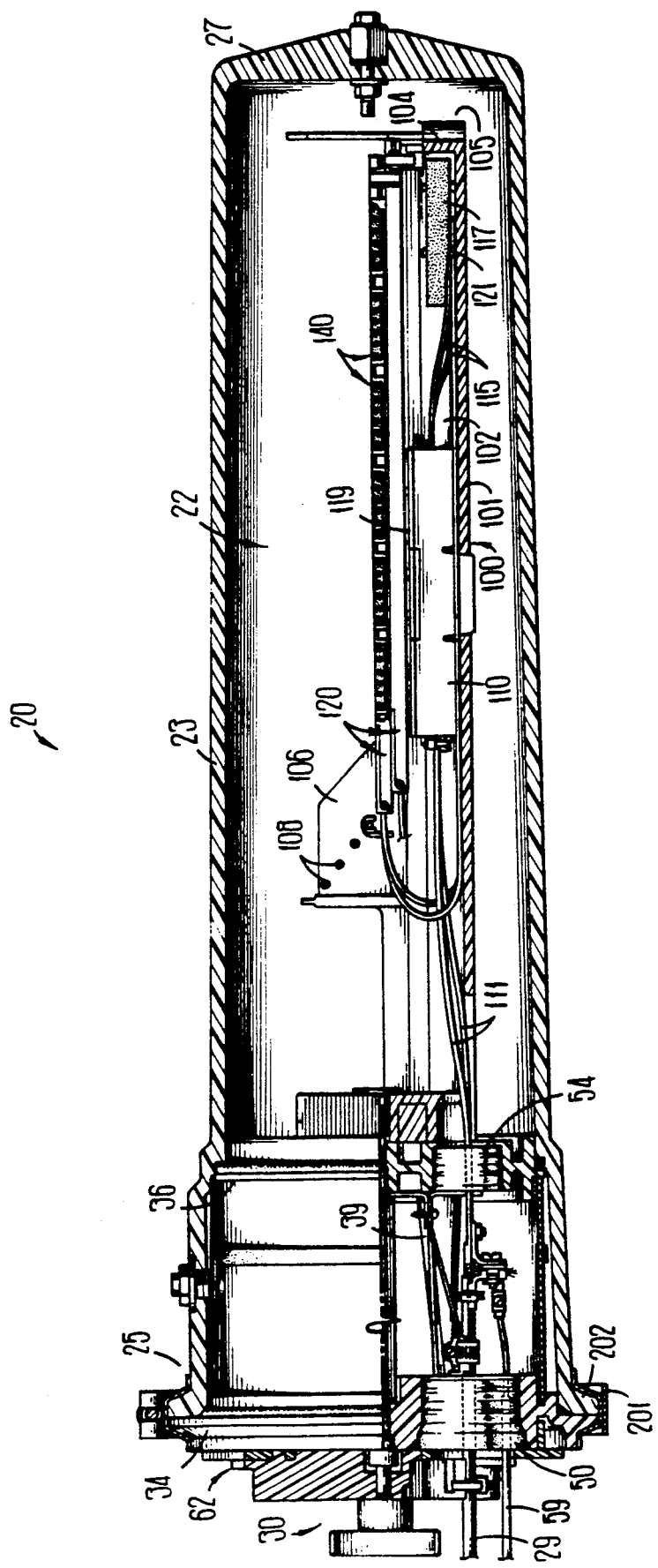
FIG. 2 is a side elevational view partially in section of the cable termination assembly and cover of FIG. 1.

As also can be seen in FIG. 1, the cable splicing termination assembly 22 includes a cable entry portion 30. The cable entry portion 30 may include two spaced end plates 34 and 36 each of which is disc-shaped with the end plate 34 being referred to as an outer end plate and the end plate 36 being referred to as an inner end plate. Each of the end plates 34 and 36 is made preferably of a molded plastic, glass-reinforced polypropylene. The two end plates 34 and 36 are held in assembled relationship spaced apart by a central stud and three circumferentially disposed standoffs 39—39 only one of which is shown in FIG. 2 and which are molded integrally with the inner end plate 36. Each of the end plates may be provided with three oval shaped openings with those in the outer end plate 34 being designated 41, 43 and 45 and with those in the inner end plate 36 not being shown but being aligned with the openings in the outer plate. A more detailed showing of the end plates is provided in aforementioned U.S. Pat. No. 4,927,227, which is incorporated by reference hereinto.

Disposed in the opening 43 is a grommet 50 (see FIG. 2) which is made of an elastomeric material. The grommet 50 includes two passageways through which are destined to extend the cables 28 and 29 to be spliced. Similarly, a grommet 54 which is aligned with the grommet 50 and which includes two passageways is disposed in an opening in the end plate 36. Further, the grommet 50 is provided with openings to allow passage through the grommet of ground wires 59—59 or a ground ribbon. Although two cables to be spliced are destined to extend through the passageways of the aligned grommets 50 and 54, each ground wire 59 need only extend through the first grommet because it is terminated between the two end plates.

Unless it is known from the outset that more than two cables are to be spliced in the closure 20, the other two sets of aligned openings in the end plates are plugged with dummy plugs. Advantageously, as more cables need to be spliced in the closure 20, one or both of the dummy plugs is removed and replaced with a pair or pairs of grommets similar to the grommets 50 and 54.

Outboard of the outer end plate 34 is situated a retainer yoke 62 (see FIG. 1) which includes three equiangularly extending ribs 64—64. The central stud which is secured to the end plates 34 and 36 extends through a central opening in the yoke and a knob is turned onto the stud to hold the yoke secured in place. The yoke 62 functions to hold the plugs and grommets in place and to stabilize the closure structure. Each of the ribs 64—64 terminates in a cross-member 65.

Disposed between the end plates 34 and 36 are facilities for securing the cables 28 and 29 against unintended movement and for establishing a ground connection with any metallic elements of each cable. The manner in which the cables between the two grommets is secured also is important. Suitable securing of the cables in this area will prevent undue forces from being transmitted past the inner grommet to the splice work. A detailed description of such securing and grounding means is provided in aforementioned U.S. Pat. No. 4,927,227.

Cantilevered from the inner end plate 36 and the central stud is a cable splice support assembly 100 (see FIG. 2). The assembly 100 includes a frame 101 which includes sidewalls 102—102 and an end dam 104 at a free end 105 thereof. Each of the sidewalls 102—102 includes a projecting wing portion 106 having a plurality of pins 108—108 extending inwardly and arranged in stairstep fashion along the projecting wing portion.

As mentioned hereinbefore, the portions of the optical fiber cables 28 and 29 which extend beyond the cable end plate 36 into the cable splice support assembly 32 have the shields and other sheath components removed therefrom. Only a core tube 111 or tubes of each cable extends through the end plate 36 and extends into engagement with an optical fiber breakout 110. If the cable is of the ribbon type, a craftsperson may choose to route ribbons to splice trays without separating fibers and putting them into tubes.

The optical fiber breakout 110 is used to effect a transition between the plurality of optical fibers in a cable structure to a regrouping of optical fibers in one or more tubes outgoing from the breakout to a particular splicing area of the closure 20. Each core tube 111 of a cable is adapted to be received in a channel formed between partitions in one end of the fiber breakout. The core tube 111 is removed from the remaining length of the cable so that only the optical fibers of the cable extend beyond the channels and into the breakout. Within the fiber breakout 110, the optical fibers are organized and inserted in predetermined groups into plastic routing tubes 115—115 (see FIG. 2). The tubes 115—115 are arranged so that one end portion of each is received in a channel formed between partitions at the opposite end of the fiber breakout, that is the end oriented toward the free end 105 of the frame 101. A lid 119 (see FIG. 2) covers the breakout 110 to protect the bared, coated optical fibers 21—21 therein.

After the tubes 115—115 emerge from the breakout 110, each of the tubes is routed in a retroflexed configuration and directed back toward the inner end plate 36. In that direction, the tubes 115—115 are destined to be routed and secured to selected ones of a plurality of trays 120—120 (see FIG. 1, 2 and 3) on each of which the splicing is to be performed. Within the free end portion of the frame 101 is disposed a foam pad 117 which is received over pins 121—121 to cushion fibers or fibers which are stored in loops between the breakout 110 and the free end 105 during handling.

The trays 120—120 are mounted pivotally to the frame 101 and are adapted each to hold a plurality of spliced optical fiber portions. Advantageously, each tray 120 is made of a plastic material such as polycarbonate, for example and is adapted to be mounted pivotally on a pair of the opposing pins 108—108. A description of the hinging arrangement is provided in aforementioned U.S. Pat. No. 4,927,227.

Further, each tray 120 includes a plurality of overhanging portions 127—127. Optical fibers extending from the tubes which enter the trays through channels 123—123 (see FIG. 3) are routed under these portions 127—127 before being turned in toward splicing portions of the tray.

Figure 3:
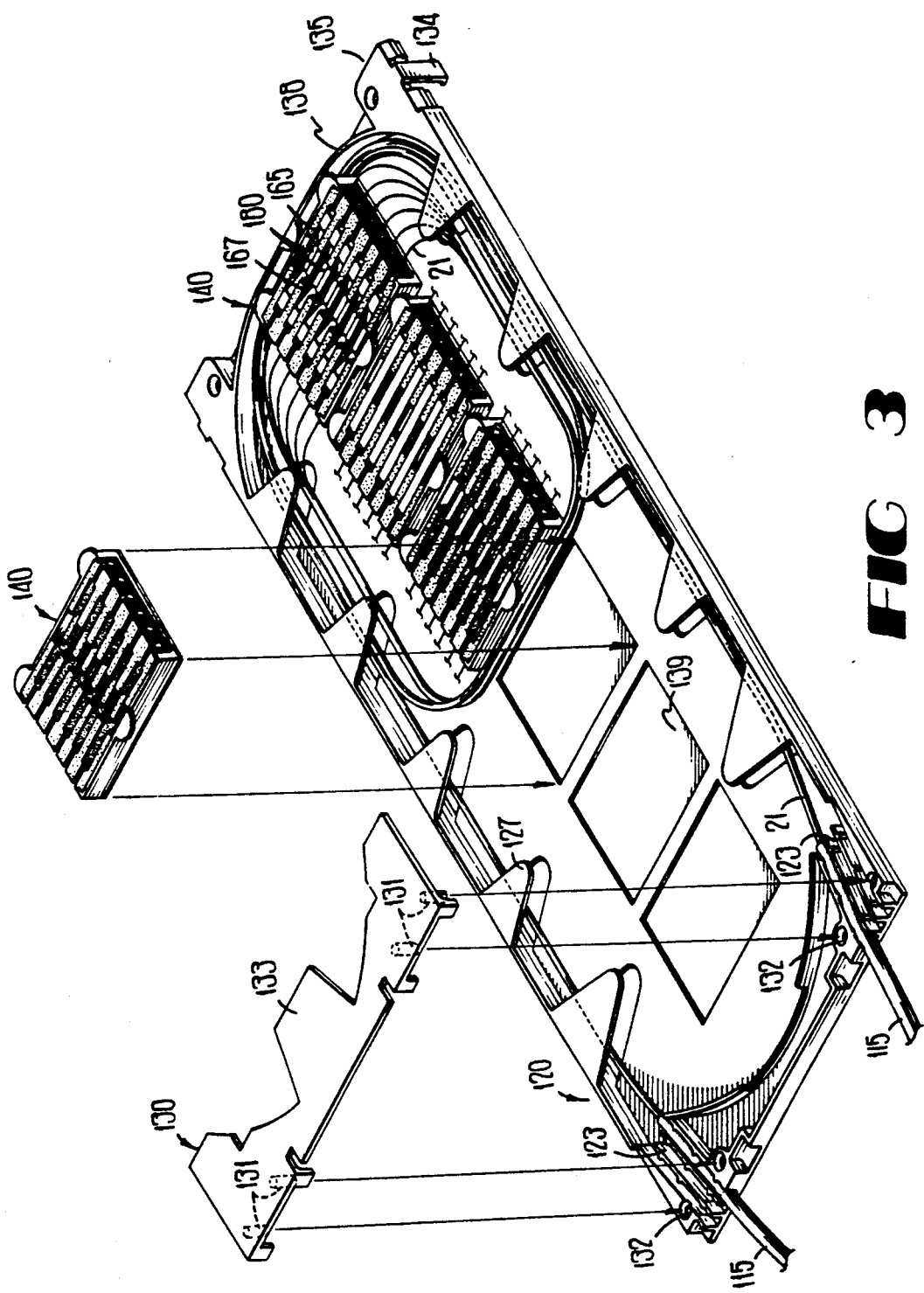
FIG. 3 is an enlarged perspective view of a splice tray of the cable splicing termination assembly of FIG. 1.

Each tray 120 also has associated therewith a hinge lock plate 130 (see FIGS. 1 and 3). The hinge lock plate 130 spans across the tray at the optical fiber entrance end and includes four locking pins 131—131 which are received in openings 132—132 in the tray. The opposite end of the hinge lock plate 130 which is adjacent to the hinged end of the tray includes a cutout. When the hinge lock plate 130 is assembled to a tray 120, a hinge which facilitates the pivotal movement of the tray is completed.

The hinge lock plate 130 has several functions. Not only does it complete a hinge for its associated tray 120, but also it secures incoming tubes 115—115 or ribbons, which contain optical fibers, within the tray. Also a tongue 133 serves to restrain loops of slack fiber from being dislodged form the tray. At the hinge lock plate end of the tray 120, it will be recalled that tubes 115—115 in which are disposed optical fibers and which have been routed from the optical fiber breakout extend through channels 123—123 (see FIG. 3) into the tray splice area. Advantageously, the hinge lock plate covers these channels thereby securing the tubed fibers or ribbons against unintentional movement. Also, it prevents transfer of undue forces to the splices which are supported in the tray and includes fingers which are effective to hold the optical fibers in desired positions. Also, a portion of each tube 115 or ribbon which is disposed in a channel 123 is wrapped with a foam strip having an adhesive layer which engages surfaces of the tube or ribbon to secure the tube or ribbon therewithin.

Each tray 120 also includes a pair of detents 134—134 which depend from an end 135 of the tray and depend from that major surface of the tray opposite to that on which the splices are mounted. These detents are adapted to become disposed in recesses formed in the frame 101 or to snap-lock to an underlying tray. As the innermost tray 120 is positioned in the frame 101, resilient latches of the frame snap into position over an end surface 138 of the tray to hold that tray secured to the frame. Then, as each successive tray is mounted to the frame 101, its detents snap-lock over an inner surface of the previously mounted tray to hold the successive tray to the preceding tray. In use, each tray is to be released from an underlying tray before it is turned pivotally to expose the splices supported on the underlying tray.

The closure 20 allows for the protected transition of optical fibers 21—21 as grouped in a cable to be rearranged into groups in tubes 115—115 that are then routed to splicing trays 120—120 where they are to be spliced to another regrouped plurality of optical fibers. The transition is caused to occur within the optical fiber breakout 110 thereby protecting the optical fibers 21—21 from inadvertent damage.

Each tray 120 includes facilities which are enhanced over those of prior art closures for storing a plurality of connective arrangements for optical fibers of cables which extend into the closure 20. It should be understood that such arrangements may include connectors or splicing devices or splices formed by fusion methods. The facilities are such that not only is the number of splices which may be stored on each tray enhanced over prior art closures, but also, any of a plurality of different commercially available splices may be accommodated. As can best be seen in FIG. 3, each tray 120 is formed to include a plurality of rectangularly shaped, relatively shallow recesses 139—139 each of which may have a depth typically on the order of 0.020 inch.

To be received in each of the recesses is a splice organizing module 140. In the preferred embodiment, each of the modules 140—140 is adapted to hold six optical fiber splices.

Figure 4:
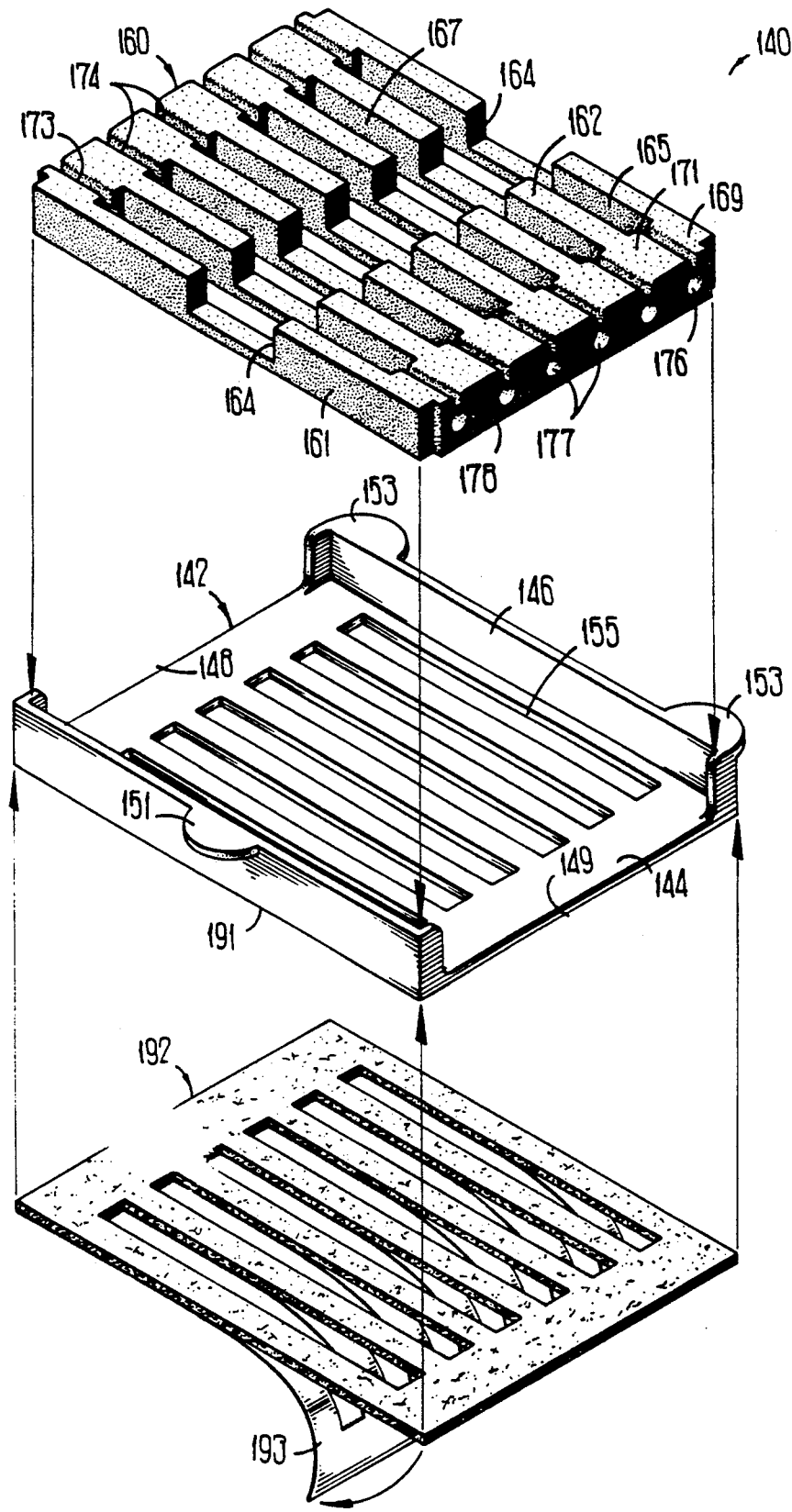
FIG. 4 is an exploded perspective view of a splice organizing module of the splice tray of the cable termination assembly and depicts an insert which is adapted to hold a plurality of splicing arrangements.

Viewing now FIG. 4, it can be seen that each splicing module 140 includes a holder 142 which includes a base 144, two sidewalls 146—146 and open ends 148 and 149. Also, it is seen that one of the sidewalls 146—146 is formed to include one overhanging tab 151 whereas the other sidewall is formed to include two overhanging tabs 153—153. Further, the base 144 may be formed to include a plurality of parallel, rectangular slots 155—155. In the preferred embodiment, the base 144 includes six such slots.

Adapted to become disposed in each holder 142 is an insert 160 which is adapted to store a plurality of optical fiber splices which may be made using any of a plurality of commercially available optical fiber splice arrangements. Each insert is made of a material which is compliant about the configuration of the particular connective arrangement which is used.

As can be seen in FIG. 4, the insert 160 includes two sidewalls 161—161 between which are disposed a plurality of partitions 162—162. Each of the sidewalls and each of the partitions is provided with a generally centrally located slotted opening 164 with the openings being aligned transversely across the insert. A nest 165 is formed between each sidewall 161 and the adjacent partition 162 and a nest 167 is formed between adjacent ones of the partitions. Each nest opens to a lower surface of the module as viewed in FIG. 4 and is aligned with one of the slots 155—155. Further, end portions of an adjacent sidewall and partition or partitions are enlarged as shown by the portions 169 and 171 to provide grooves 173 and 174 of reduced width along the end portions. Still further, externally facing portions of each of the grooves 173 and 174 opens to a bore 176 and 177, respectively, which extends from an outside face 178 of the insert through the enlarged portions. The insert 160 comprises a compliant material such as a cellular material, for example. A suitable cellular material is a foam plastic material. As such, the material of the insert is capable of being compressed as a splicing connector is inserted and to reconfigure itself about the splicing connector to hold it securely within an associated nest.

Figure 5:
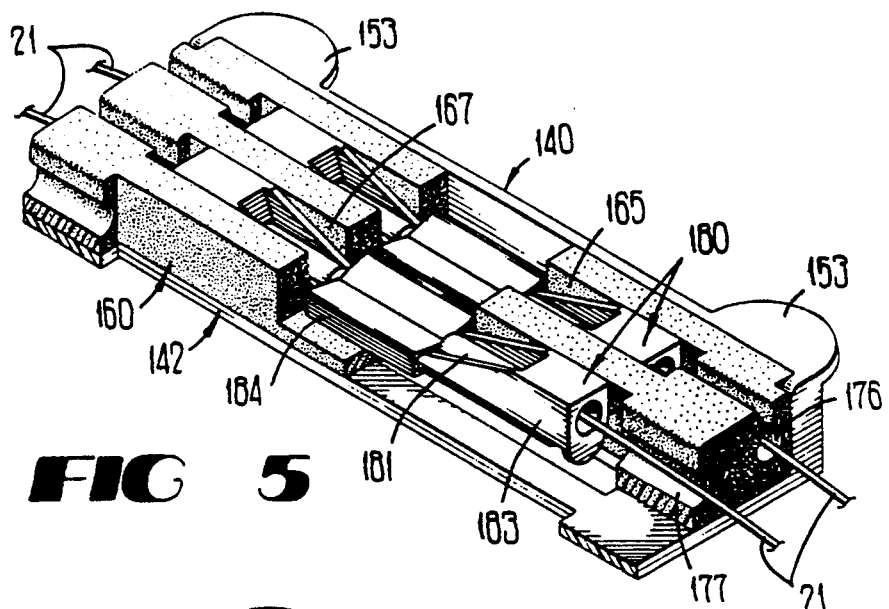
FIGS. 5, 6 and 7 are perspective views of splice organizing modules as used to accommodate different kinds of splicing arrangements.

Also, because of the material of which it is made, the insert 160 is adapted to accommodate any of a plurality of commercially available splicing arrangement. One popular splicing arrangement is a device which is referred to as a cleave, sleeve, and leave (CSL) splicing device. One such CSL splicing device 180 is disclosed in patent application Ser. No. 07/439,747 which was filed on Nov. 20, 1989 in the names of J. Aberson, et al. and is depicted in FIG. 5. It includes a glass, cylindrically shaped capillary tube member 181 having a passageway formed therethrough eccentrically of the longitudinal axis of the capillary tube member. The capillary tube member is provided with a slot such that a portion of the passageway in the form of a groove extends across a planar surface formed by the slot. The capillary tube member 181 is mounted in a housing 183. A spring clamp 184 is mounted to the housing in a first position spaced from the planar surface to allow insertion of fiber end portions into the groove. The clamp is moveable to a second position where it is secured to the housing in a position which causes a portion of the clamp to engage the fiber end portions along at least a portion of the planar surface to hold the fiber end portions in secured alignment with each other.

Referring again to FIG. 5, it can be seen that the so-called CSL splicing device 180 is accommodated easily in the insert 160. As can be seen, the spring clamp 184 of each CSL device fits within the slotted openings of the sidewalls and the partitions. The housing 183 becomes disposed in one of the nests 165 and 167 with spliced fibers 21—21 extending outwardly through the bores 176—176 or 177—177.

Figure 6:
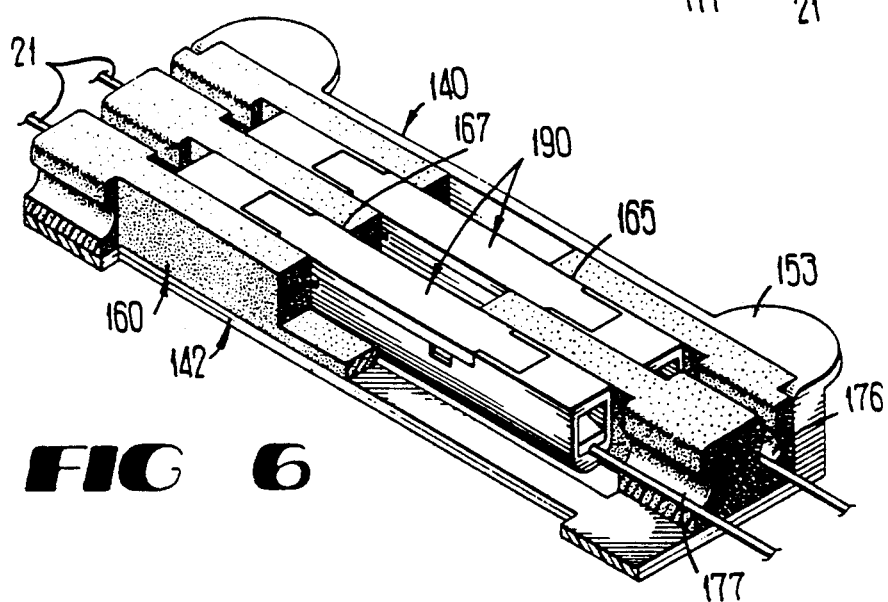

Another commercially available cleave, sleeve and leave splicing device is one which is termed the Fiberlok ® splicing device as marketed by the 3M Company. Such a device 190 is portrayed generally in FIG. 6 and is seen to be accommodated within an insert 160 and a holder 142. The slots 155—155 in the holder 142 accommodate lower portions of the Fiberlok device so that even a splicing device having a somewhat large height may become disposed in the organizing module. Of course, the insert 160 could be made with a larger height thereby obviating the need for the slots 155—155.

Figure 7:
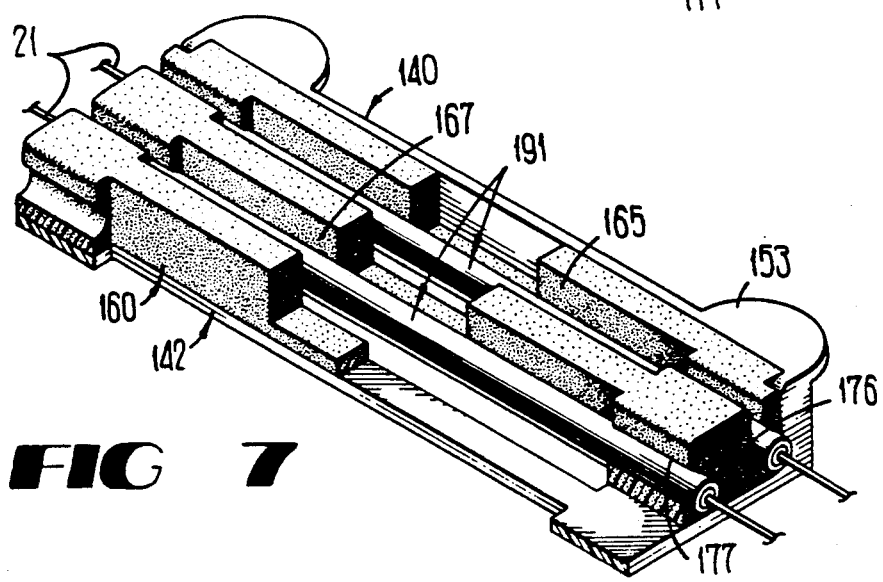

In the well known fusion splice, coating materials are removed from end portions of two optical fibers to be spliced. After the bared end portions have been spliced by a fusion technique, the bared spliced portions may be recoated with a suitable material. For a fusion splice, recoated portions 191—191 are received in the insert 160 (see FIG. 7) and retained within the bores 176—176 and 177—177.

In order to secure each splice organizing module to a surface of a recess 139 (see FIG. 3) of the tray 120 in which it is to become disposed, the lower surface 191 of the holder is provided with an adhesive material 192 having a cover layer 193. When it is desired to secure a module to a tray, a craftsperson removes the cover layer 193 and engages the adhesive material 192 with the surface of the recess 139.

When two modules 140—140 are disposed side-by-side in a tray 120, the tabs 151 and 153—153 provide a significant function. Each tab 151 becomes disposed between tabs 153—153 of an adjacent module to provide a channel in which slack fibers may be stored. The fibers may be placed easily into the channel formed between the modules. The tabs become interleaved (see FIG. 3) to form a serpentine path along which fibers may be added or removed. However, the stiffness of the fibers prevents them from slipping out from under the tabs.

After the splicing has been accomplished as described earlier herein, the craftsperson causes a cover to be applied over the outermost tray 120. Then the craftsperson assembles the splicing termination assembly 22 to the cover 23. The termination assembly 22 is inserted into the cover 23 and a clamping band 201 (see FIG. 1) is caused to be disposed about a rim 202 (see FIG. 2) of the cover and the outer end plate 34. The clamping band 201 is caused to be tightened about the cover and the end plate to secure them together and to hold the termination assembly in the cover 23. Each of the end plates cooperates with the cover 23 to seal the closure against the unintended ingress of contaminants or the egress of pressurized air.

If desired, the volume between the end plates may be filled with a suitable encapsulant. In the alternative, other suitable waterblocking arrangements may be used.

The closure of this invention has many advantages over prior art closures. It has enhanced storage capability, not only in the number of optical fiber splices that may be stored in each tray 120, but also in the kinds of splicing arrangements which may be accommodated. Each resilient insert 160 stores securely splicing devices without causing unduly high forces to be applied to the splices or to the optical fibers which extend from the splicing devices.

The organizing facility, the splicing organizing module, is modular in design and has a capacity for six splices. This is advantageous in that it conforms to the six and twelve fiber units and ribbons which are typical in optical fiber cables.

Further, the organizing module of the closure of this invention has utility in other applications. It may be used in any environment in which it is desired to hold splicing devices. Still further, its orientation may be horizontal, vertical or inclined.

Figure 8:
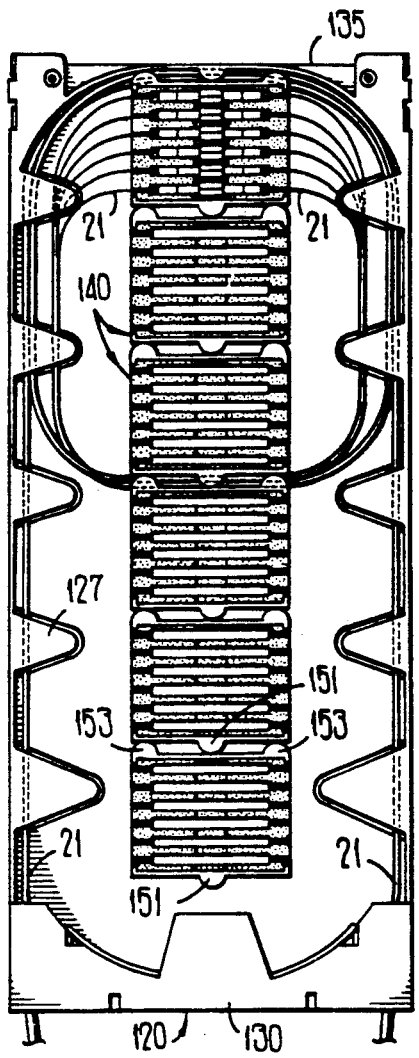
FIGS. 8 and 9 depict plan views of a tray with organizing modules supported therein and showing routing of optical fibers to nests of splice organizing modules.
Figure 9:
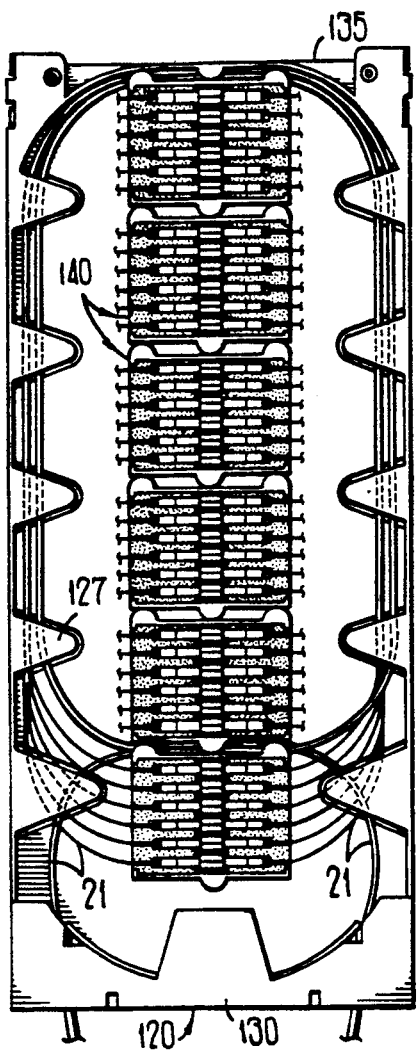

Shown in FIGS. 8 and 9 are plan views of a tray 120 which depict example routing paths for optical fibers 21-21. FIG. 8 depicts typical routing arrangements for each of the top five modules, as viewed in FIG. 8, whereas FIG. 9 depicts that for the module closest to the hinge lock plate 130. As can be seen in FIG. 8, tubes enter the tray at the hinge lock plate end thereof and after a relatively short distance emerge from the tubes and are routed to ones of the organizing modules 140-140. In order to avoid unduly sharp radius bends in the optical fiber, the optical fibers extending along the left side of the tray 120, as viewed in FIG. 8, may be routed along the end 135 of the tray, then in an opposite direction along the right hand side of the tray back toward the hinge lock plate, again as viewed in FIG. 8, and, after the length of several organizing modules, across the tray in a channel formed by overhanging tabs 151 and 153-153. After the fibers emerge from the channel between adjacent modules, the fibers are routed again toward the end 135 and broken out to individual ones of splicing connections in that module which is adjacent to the end 135.

In FIG. 9, incoming tubes enter the tray 120 at the hinge lock plate and after a relatively short distance, fibers emerge from the tubes and extend across the tray in a channel formed by overhanging tabs 151 and 153-153 between the module adjacent to the hinge lock plate and the next adjacent module. After the fibers emerge from the channels, they extend along a sidewall of the tray toward and loop around the end 135 of the tray. Then the optical fibers extend again along the leftmost sidewall, as viewed in FIG. 9, in a direction toward the hinge lock plate with particular fibers broken out from a unit or a ribbon to be turned inwardly toward the module which is closest to the hinge lock end of the tray.

Figure 10:
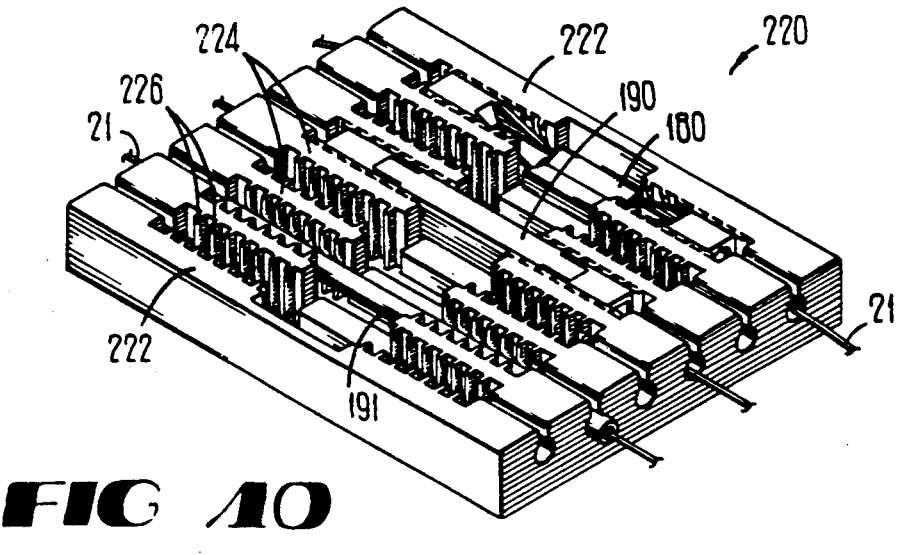
FIG. 10 depicts an alternate embodiment of the insert of FIG. 4.

Another embodiment of the organizing module insert is depicted in FIG. 10 and is designated generally by the numeral 220. The insert 220 is made of a compliant material and is structurally identical to the insert 160 except that inwardly facing surface of sidewalls 222-222 and of partitions 224-224 are provided with extending ribs 226-226. The ribs 226-226 are effective in enhancing the securement of splicing arrangements which are received in the channels formed between the sidewalls and the adjacent partitions and those formed between the partitions.

It is to be understood that the above-described arrangements are simply illustrative of the invention. Other arrangements may be devised by those skilled in the art which will embody the principles of the invention and fall within the spirit and scope thereof.

I claim:

1. An optical fiber cable closure, said closure comprising:
   a cover having a closed end and an open end; and
   a cable termination assembly which is adapted to become disposed within said cover, said cable termination assembly including:
      cable entry means through which cables to be provided with connective arrangements are routed into said closure;
      support means which extends from said cable entry means and which has a free end adapted to be disposed adjacent to said closed end of said cover;
      at least one tray which is mounted on said support means for holding optically connected portions of optical fibers of cables; and
      at least one organizing module which is mounted in said at least one tray, each said module including compliant means for holding a plurality of optical fiber connective arrangements which may include different kinds of connective arrangements, said tray being capable of holding a plurality of said modules.

2. The closure of claim 1, wherein each said organizing module includes
   a holder, and
   an insert which is adapted to become supported in said holder, said insert being made of a compliant material and having a plurality of nests formed therein, said compliant material which defines a nest being such as to be reconfigured as a connective arrangement is inserted into the nest to engage and hold the connective arrangement within the nest.

3. The closure of claim 2 wherein said insert is formed to include a plurality of parallel, longitudinally extending nexts therein, each said nest at each end of said insert communicating with a groove which opens to an outer surface of said insert and with a bore which opens to an end face of said insert.

4. The closure of claim 3, wherein each said insert includes opposed sidewalls and a plurality of partitions between which are formed said nests, each of said sidewalls and each of said partitions being provided with a slot with the slots in the sidewalls and in the partitions being aligned transversely across said insert.

5. The closure of claim 4, wherein said holder is provided with a surface which engages a surface of said insert and to which a plurality of longitudinally extending slots open, said slots being aligned with said nests in said insert when said insert is supported in said holder.

6. The closure of claim 5, wherein an opposite surface of said holder is provided with an adhesive material to secure said holder to a surface.

7. The closure of claim 4, wherein said holder is provided with tabs along said sidewalls thereof such that when two such inserts become disposed adjacent to each other, said tabs of adjacent sidewalls become interleaved to form a channel for receiving optical fiber.

8. The closure of claim 2, wherein each said insert is capable of being separated from a holder in which it is mounted.

9. The closure of claim 2, wherein each said tray is adapted to hold thirty-six splices.

10. The optical fiber closure of claim 2, wherein said closure includes a plurality of trays and also includes optical fiber breakout means into which optical fibers from each cable to be spliced extend for facilitating the transition between optical fibers as grouped in the cables to be spliced and groups of fibers to be spliced on said trays, and out of which extend a plurality of tubes, each said tube having at least one optical fiber disposed therein and extending from said optical fiber breakout into a tray.

11. The optical fiber closure of claim 10, wherein each said tube extends from said optical fiber breakout means into an entrance channel of one of said trays with optical fibers disposed within each said tube extending from said entrance to said organizing modules.

12. The optical fiber closure of claim 11, which includes hinge lock plate means connected removably to each said tray means and effective to hold each said tube or one or more ribbons at its entrance to a tray in said tray and to prevent unintended movement of the portion of the tube or ribbons which extends through the entrance portion of said tray, said hinge lock plate also being effective to lock said tray to a pair of opposed pins.

13. The optical fiber closure of claim 12, wherein each of said tubes extends outwardly from an end of said fiber breakout means which is oriented toward the free end of said support means and is routed in a retroflexed configuration toward said cable entry means.

14. The optical fiber closure of claim 10, wherein each of said trays may be mounted pivotally to said support means.

15. The optical fiber cable closure of claim 10, which includes a hinge lock plate associated with each said tray and wherein each said hinge lock plate includes at least one deformable pin depending therefrom and received in an opening which is formed in the associated tray.

16. The optical fiber cable closure of claim 10, wherein each of said trays includes a plurality of channels formed at a fiber entrance end thereof and being disposed on the same major side of said tray on which said organizing modules are disposed.

17. The optical fiber closure of claim 10, wherein said optical fiber breakout means includes a plurality of channels oriented toward said cable entry means for receiving and holding portions of said incoming cables and a plurality of channels at that end of said breakout means oriented toward said free end of said support means for receiving and holding the tubes in which are disposed the optical fibers and which are routed to selected ones of said trays.

18. The closure of claim 2, wherein said insert is comprised of a cellular material.

19. An organizing module for holding at least one optical fiber connective arrangement, said organizing module comprising:
   a holder which is capable of being mounted on a supporting surface; and
   an insert which is supported in said holder and which includes a plurality of nests each adapted to receive an optical fiber connective arrangement, said insert being made of a compliant material and having a configuration which facilitates the reception and the retention of any of a plurality of optical connective arrangements in each of said nests, said compliant material being reconfigured as an optical connective arrangement is introduced into each nest.

20. The organizing module of claim 19, wherein said insert is formed to include a plurality of parallel nests therein, each said nest at each end of said insert communicating with a groove which opens to an outer surface of said insert and with a bore which opens to an end face of said insert.

21. The organizing module of claim 20, wherein each said insert includes opposed sidewalls and a plurality of partitions between which are formed said nests, each of said sidewalls and each of said partitions being provided with a slot with the slots in the sidewalls and in the partitions being aligned transversely across said insert.

22. The organizing module of claim 21, wherein said holder is provided with a surface which engages a surface of said insert and to which a plurality of longitudinally extending slots open, said slots being aligned with said nests in said insert when said insert is supported in said holder.

23. The organizing module of claim 21, wherein an opposite surface of said holder is provided with an adhesive material.

24. The organizing module of claim 21, wherein said holder is provided with tabs along said sidewalls thereof such that when two such modules become disposed adjacent to each after, said tabs of adjacent sidewalls become interleaved to form a channel for optical fiber.

25. The organizing module of claim 19, wherein said insert is comprised of a cellular material.

* * * * *